United States Patent [19]

Moransais

[11] 3,709,071
[45] Jan. 9, 1973

[54] CABLE-TIGHTENING DEVICE

[75] Inventor: Charles Moransais, La Boisse, France

[73] Assignee: Zafira France, La Boisse, France

[22] Filed: June 1, 1970

[21] Appl. No.: 41,805

[30] Foreign Application Priority Data

June 2, 1969 France.................................6917990
Oct. 28, 1969 France...............................6936951

[52] U.S. Cl....................................81/3 J, 24/136 A
[51] Int. Cl...............................................F16g 11/10
[58] Field of Search .81/3 J; 24/126 B, 136 A, 244 R, 24/171, 194

[56] References Cited

UNITED STATES PATENTS

| | | | |
|---|---|---|---|
| 2,346,477 | 4/1944 | Ederer | 24/136.2 X |
| 3,517,420 | 6/1970 | Anzimi | 24/126 L |
| 3,189,038 | 6/1965 | Von Pechmann | 24/126.2 X |
| 637,239 | 11/1899 | Davis | 24/126.2 |
| 225,923 | 3/1880 | Fenton | 24/136.2 |
| 2,632,932 | 3/1953 | Blake | 24/136.2 |

FOREIGN PATENTS OR APPLICATIONS 345,304  12/1936  Italy.....................................24/136.2

Primary Examiner—Robert C. Riordon
Assistant Examiner—Roscoe V. Parker, Jr.
Attorney—Charles E. Baxley, Frank M. Nolan and Thomas E. Tate

[57] ABSTRACT

A cable-tightening device of the kind in which the cable is wedged between two parts which are clamped against each other when a tractive pull is applied in one direction on the cable, while the latter is free to slide through the device when the direction of the pull is reversed, comprising a tubular casing having a wall traversed by an oblique channel located in a radial plane and intended for the passage of the cable, and a cylindrical rotatable plug with longitudinal nipples mounted inside the tubular casing and elastically urged towards the cable-channel outlet, the longitudinal chamber formed inside the casing having a quadrilateral section and the diameter of the plug being slightly less than the dimension of the quadrilateral section in said radial plane.

5 Claims, 7 Drawing Figures

CABLE-TIGHTENING DEVICE

The present invention relates to a cable-tightening device, in which the cable is wedged between two parts which are clamped against each other when a tractive pull is applied in one direction on the cable, the latter on the contrary being free to slide in the tightening device when it is pulled in the opposite direction.

One type of tightening device is known which is constituted by a frame having the form of a tube with circular sections in which is formed, from the interior to the exterior, an oblique channel for the passage of the cable. A moving member or plug, substantially spherical, is acted upon by a spring in the direction for which it grips the cable engaged in the channel, so that the gripping action is practically ensured as soon as the plug is applied against the cable.

In tightening devices of this type, it is necessary to provide the spherical plug with two fins extending outside the tube and capable of moving in two longitudinal windows formed in the tube, in order to permit the user to move the spherical plug back so as to allow the engagement of the cable in its channel, or its release as the case may be.

However, these lateral fins increase the cost price of the unit:

both by their existence, that of the fixing means (keys) and by the machining which is necessary on the parts;

and also by the time required for the assembly of the unit.

Now, the assembly operations for this type of article, which must be extremely cheap, have a predominating influence on the cost price; thus, in the present case, the assembly of fins on the spherical plug represents a considerable increase in the prices of these tightening devices.

Cable tighteners are furthermore known which have a cylindrical plug housed in a U-section frame, the extremities of the plug sliding in windows formed in the frame and projecting to the exterior, thereby permitting manual operation of the plug. However, for considerations of strength, the structure of this plug necessitates the use of a metal frame, since the clamping forces are applied exclusively at the level of the walls in which the windows are pierced.

In addition, when the plug is actuated by a spring, this latter, to be effective, must be fixed to the frame since at least one wall of the frame is open.

The fact that the frame must be made of metal and that the spring, where this is used, necessitates a special assembly, results in high manufacturing costs.

Thus, the two known types of tightening devices have the disadvantages of complexity of assembly and high cost.

The present invention has for its object to overcome these disadvantages and in particular to produce a tightening device of simple construction and low production cost.

A cable-tightening device according to the invention comprises a tubular frame having a wall traversed by an oblique channel located in a radial plane and intended for the passage of the cable, and a plug movable inside the tubular frame and elastically urged by a spring towards the extremity at which the channel opens towards the interior of the frame, and this tightening device is characterized in that the longitudinal chamber provided in the tubular frame has a section of quadrilateral shape, and the plug is constituted by a substantially cylindrical body, the diameter of which is slightly less than the dimension of the quadrilateral section located in the said radial plane.

The said plug body is extended laterally and on each side by two nipples capable of moving in appropriate longitudinal windows in the tubular frame. The diameter of these nipples is less than the height of the windows, so that when the cable is clamped by the plug, the latter is supported along one of its generator lines against the wall of the frame opposite to that in which is formed the oblique passage channel for the cable. The clamping force is thus distributed over the two opposite walls of the tubular chamber.

The good distribution of this clamping force makes it possible to construct the frame of moulded thermoplastic material, which enables the cost of manufacture to be still further reduced.

The plug is made in a single piece, either of metal such as chromium-plated steel or of plastic material. In addition, the section of the plug body may be either cylindrical or slightly ovoid, the principal axis of the section being then preferably directed along the longitudinal axis of the chamber.

By virtue of the arrangement according to the invention, the assembly and dismantling of the plug inside the frame are easy.

According to an especially advantageous form of the invention, the lateral nipples are large enough to prevent the plug from escaping out of the tubular frame and are short enough to permit engagement of the plug obliquely in the tubular frame without it being necessary to provide other handling means than the projecting extremities of the two small nipples.

In certain cases of application however, it may be necessary to employ a plug with long nipples, and in this case its engagement in the frame cannot be carried out as indicated above.

The said plug is then introduced laterally into the frame through a circular opening formed behind at least one of the longitudinal windows.

Finally, in the case where the extremities of the nipples, intended to be located after placing the plug in position outside the frame, have a width greater than the width of the windows, each of the longitudinal windows will terminate at the rear in a circular opening having a diameter greater than the extremities of the nipples, in order to permit the plug to be introduced laterally.

According to a further object of the invention, the frame comprises, as in the case of known tightening devices, hooking means permitting the tightener to be hooked either to one extremity of the cable itself, or at a fixed attachment point, the said frame and the hooking means being made in a single piece of moulded thermo-plastic material, which results in an appreciable economy during the course of manufacture.

More particularly, the hooking means is constituted by an extension of the frame, which is pierced with a simple hole.

This form of construction enables the economy obtained by a one-piece construction to be combined with adequate strength of the hooking means to withstand the traction forces of the cable.

Other advantages and characteristic features of the invention will be brought out during the course of the description which follows below of a few forms of construction, given by way of example, reference being made to the accompanying drawings, in which.

Figure 1:
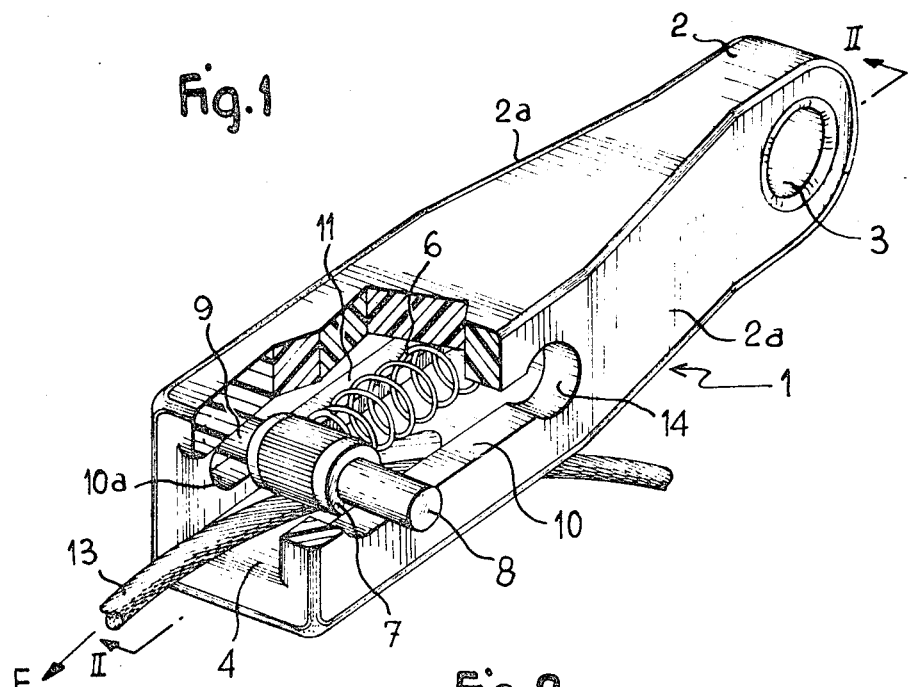
FIG. 1 is a preferred form of construction of a tightening device according to the invention, having a one-piece frame.
Figure 2:
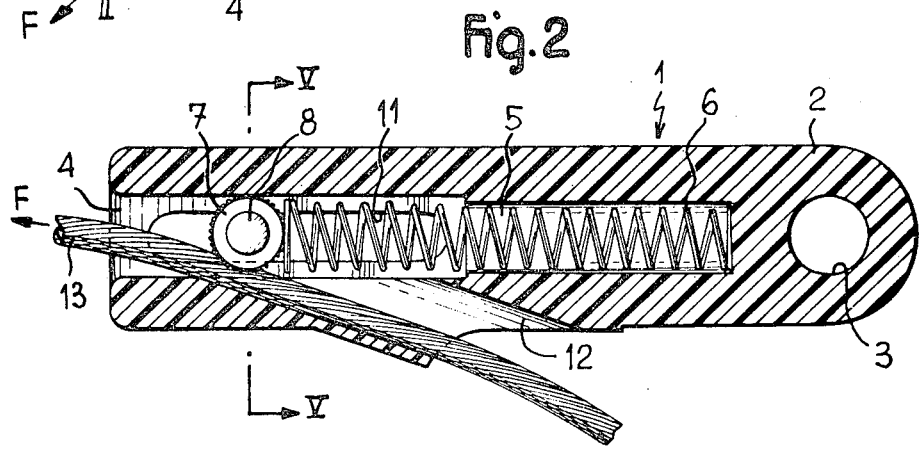
FIG. 2 is a longitudinal section taken along the line II—II of FIG. 1.

In the drawings, there has been generally indicated at 1 the frame of a tightening device according to the invention, made of moulded thermo-plastic material and integrally moulded with an end extension 2 in which is formed a hole 3, this extension permitting the attachment of the tightening device on an anchorage element of any kind.

In the preferred form of embodiment shown, the frame has an external section of quadrilateral shape, that is to say rectangular or substantially square, as shown in the drawing, and it is pierced at its front portion with an axial chamber 4, also having a quadrilateral section. In the example shown, this section is rectangular but it will be understood that it could be square.

The quadrilateral external shape of the frame permits this latter to be coupled to the extension 2 by two opposite converging slopes 2a, which, while retaining the strength of the frame, permits an economy of material. It will be noted that, in order that the traction forces applied on the frame act under the best possible conditions, that is to say in the axis of the frame, the extension 2 will preferably extend as shown in the vertical plane of the frame with respect to FIG. 1, or in the horizontal plane.

The chamber 4 is extended in the interior of the frame by a blind hole 5 of circular section, in which is housed a spring 6 intended to co-operate with a cylindrical plug 7 mounted in the chamber 4. The cylindrical plug is provided with two lateral cylindrical nipples 8 and 9 which are housed in lateral windows 10 and 11 formed in the oppositely facing walls of the frame. These windows extend from the bottom of the rectangular-section chamber 4 up to a zone relatively towards the front.

An oblique channel 12 formed in the lower face of the frame 1 enables a cable 13 to be engaged under the plug 7. The spring 6 applies the plug 7 against the cable 13 and any tension force applied on the cable in the direction of the arrow F will have the effect of increasing the clamping of the cable underneath the plug. On the other hand, if the cable is subjected to a force in the direction opposite to the arrow F, the plug will slightly compress the spring 6 and the cable will be allowed to slide under the plug.

For rapid mounting and removal of the plug 7 in the frame, there has been provided a circular opening 14 at the rear extremity of the window 10, the diameter of this opening being slightly greater than that of the plug 7.

As the nipples 8 and 9 of the plug 7 are short, this latter can be introduced obliquely into the quadrilateral-section 4, and then directed in such manner that the small nipples 8 and 9 are engaged in the windows 10 and 11. It should be noted in this connection that the circular lateral contours 7a and 7b of the cylindrical plug enable the latter to be obliquely directed between the windows 10 and 11, as has been shown in broken lines on FIG. 3.

If the precaution is taken of introducing the spring 6 and holding it back by means of a piece P engaged in the windows, the introduction of the cylindrical plug 7 (position in broken lines) can be effected very easily, and it is only necessary to release the spring by removing the piece P for the assembly to be in the operating condition, following the conventional principle of wedging, that is to say the plug 7 applying the cable 13 against the wall of the tubular frame.

Figure 4:
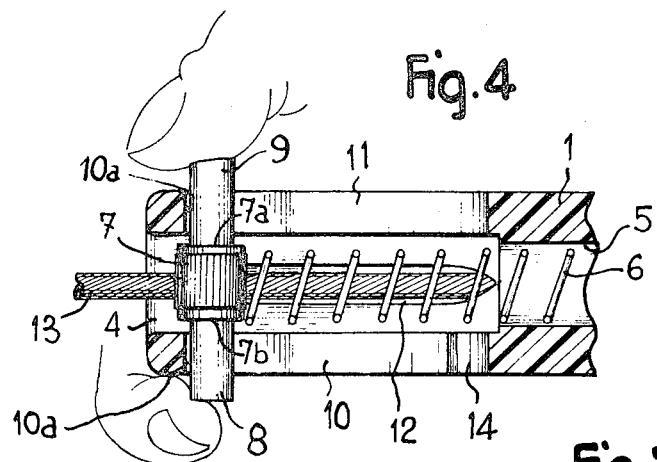
FIG. 4 is a longitudinal section similar to FIG. 3 showing the tightening device ready for use.

In this way, the small nipples 8 and 9 have sufficient length to provide suitable engagement, illustrated in FIG. 4, without it being necessary to mount fittings on each side of the plug 7 so as to give a satisfactory grip for the fingers. In consequence, the unit can be assembled very quickly, the plug 7 being immediately acted upon, as soon as the assembly is complete, by the spring 6 towards the end abutments 10a of the windows 10 and 11.

The removal of the plug is effected simply by moving it back to the bottom of the chamber 5 so that the nipples are located level with the opening 14. The plug is then extracted by sliding it laterally in the opening 14 which is of larger diameter.

Figure 5:
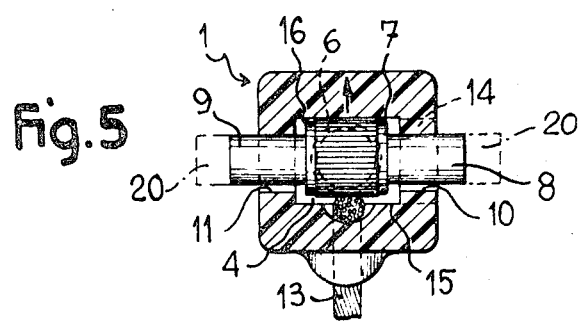
FIG. 5 is a transverse section taken along the line V—V of FIG. 2.

As can more particularly be seen from FIG. 5, the internal arrangement of the tightening device is such that when the plug 7 wedges the cable against the lower wall 15 of the frame (which may advantageously be reinforced in the zone of the channel), the upper generator line of the plug is applied against the upper wall 16 of the chamber 4. Thus, the clamping effect is mainly applied on the facing upper wall 16 and lower wall 15 of the frame in the direction of the vertical arrows. If the external section of the frame were circular, there would be formed, in the vicinity of the angles of the chamber 4, zones of lower strength which could eventually result, due to the effect of large forces, in cracking or even bursting of the frame. BY giving the frame a quadrilateral (square or rectangular) external section corresponding to its internal section, there is obtained a wall of constant thickness having satisfactory strength.

It is furthermore possible to increase this strength still more by giving the frame a square external section for a chamber having a rectangular section.

Figure 3:
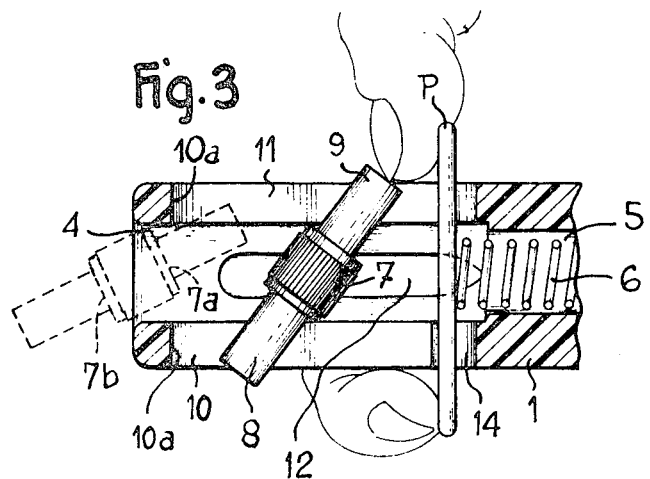
FIG. 3 is a horizontal longitudinal section showing the placing in position of the cylindrical plug with short nipples, of the tightening device of FIG. 1.
Figure 6:
FIGS. 6 and 7 show an alternative form of the plug mounted in a tightening device according to the invention.

The plug of FIGS. 1 to 5 is provided with short nipples which permit its introduction as indicated with reference to FIGS. 3 and 4. In certain cases of application however, it may be necessary to have a plug with long nipples 20, as shown in broken lines in FIG. 5, or alternatively the plug may be provided as in FIG. 6 with nipples 21, terminated at their extremity which is to be located outside the frame, by a portion of larger size, such as a hemispherical larger portion 22, for example.

In both these cases, the introduction of the plug into the frame cannot be carried out in the manner described with reference to FIGS. 3 and 4.

In the case of a plug with long nipples 20 (FIG. 5), it is introduced laterally through the circular opening 14, after having pushed back the spring 6, and a transverse sliding movement will be sufficient to place it in position. The removal of the plug is effected in the inverse order.

Figure 7:
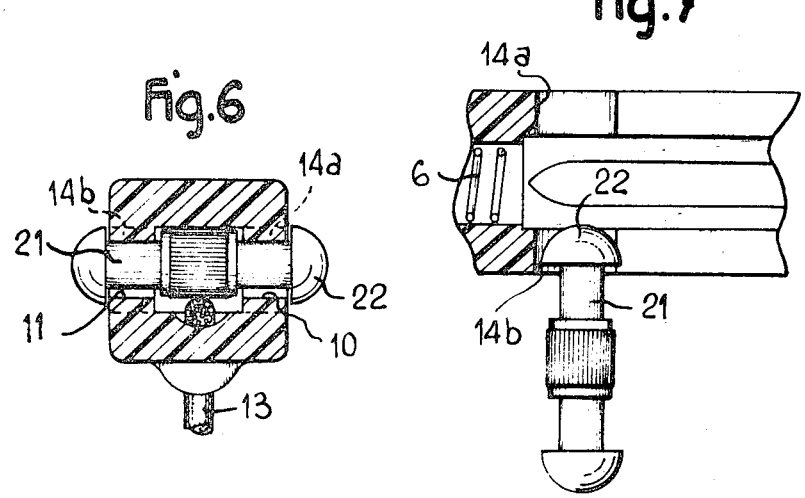

On the other hand (see FIGS. 6 and 7) in the case of a plug 21 with enlarged extremities, the frame must necessarily be provided with two circular openings 14a, 14b behind the longitudinal windows, these openings having a sufficient diameter to permit the lateral introduction of the plug, as shown in FIG. 7.

It will be noted that the plug may be made either of a metal such as chromium-plated steel, or of moulded plastic material.

In addition, although a plug with a cylindrical section has been described, it should be observed that it could have a section of any other suitable form.

Thus, a plug having an ovoid section with its major axis directed substantially along the longitudinal axis of the chamber would enable the clamping effect of the plug on the cable to be increased.

What I claim is:

1. A cable-tightening device comprising in combination:

a tubular frame with a wall in which passes an oblique channel located in a radial plane and intended for passage of the cable;

a plug adapted to move in the interior of said tubular frame and elastically urged towards the extremity at which said channel opens into the interior;

a longitudinal chamber formed in said tubular frame, said chamber having a section of quadrilateral shape, and said plug constituted by a substantially cylindrical body having a diameter slightly less than the dimension of said quadrilateral section located in the radial plane of said channel;

said tubular frame pierced with two longitudinal windows diametrically opposite on each side of said channel, and in which the body of said plug is extended on each side by a nipple the diameter of which is less than the width of the window in which said nipple is intended to be engaged;

said cable-tightening device further provided with a circular opening having a diameter slightly greater than that of the body of said plug and located at the rear extremity of at least one of said longitudinal windows.

2. A cable-tightening device comprising in combination:

a tubular frame with a wall in which passes an oblique channel located in a radial plane and intended for passage of the cable;

a plug adapted to move in the interior of said tubular frame and elastically urged towards the extremity at which said channel opens into the interior;

a longitudinal chamber formed in said tubular frame, said chamber having a section of quadrilateral shape, and said plug constituted by a substantially cylindrical body having a diameter slightly less than the dimension of said quadrilateral section located in the radial plane of said channel;

said tubular frame pierced with two longitudinal windows diametrically opposite on each side of said channel, and in which the body of said plug is extended on each side by a nipple the diameter of which is less than the width of the window in which said nipple is intended to be engaged;

said nipples being short, the total of said plug complete with its nipples being substantially less than the length of each of the longitudinal windows of said frame and greater than the width of the frame measured over the two opposite walls in which said windows are formed, said plug with short nipples being introduced into position or removed by pivoting obliquely in said chamber and moving laterally along the axis of said chamber.

3. A cable-tightening device as claimed in claim 1, in which said plug is provided with long nipples, said plug being introduced into the frame laterally through the circular opening formed at the rear extremity of at least one of said longitudinal windows.

4. A cable-tightening device as claimed in claim 1, in which the extremities of said nipples intended to be located, after placing the plug in position, outside said frame, have a width greater than that of said windows and less than the diameter of the circular openings formed at the rear extremity of at least one of said longitudinal windows, in order to permit the lateral introduction of said plug.

5. A cable-tightening device comprising in combination:

a tubular frame with a wall in which passes an oblique channel located in a radial plane and intended for passage of the cable;

a plug adapted to move in the interior of said tubular frame and elastically urged towards the extremity at which said channel opens into the interior;

a longitudinal chamber formed in said tubular frame, said chamber having a section of quadrilateral shape with a constant section through the entire length of the chamber, and said plug constituted by a substantially cylindrical body having a diameter slightly less than the dimension of said quadrilateral section located in the radial plane of said channel;

said tubular frame pierced with two longitudinal windows diametrically opposite on each side of said channel and in which the body of said plug is extended on each side by a nipple the diameter of which is less than the width of the window in which said nipple is engaged.

* * * * *